United States Patent
Cho

(10) Patent No.: US 7,070,114 B2
(45) Date of Patent: Jul. 4, 2006

(54) SMART LABEL AND MANUFACTURING METHOD THEREOF

(75) Inventor: Se-hoon Cho, Seongnam-si (KR)

(73) Assignee: Samsung Techwin Co., Ltd. (KR)

( * ) Notice: Subject to any disclaimer, the term of this patent is extended or adjusted under 35 U.S.C. 154(b) by 25 days.

(21) Appl. No.: 10/909,687

(22) Filed: Aug. 2, 2004

(65) Prior Publication Data
US 2005/0023360 A1 Feb. 3, 2005

(30) Foreign Application Priority Data
Aug. 1, 2003 (KR) .................. 10-2003-0053446

(51) Int. Cl.
*G06K 19/06* (2006.01)
(52) U.S. Cl. ..................... 235/492; 235/375
(58) Field of Classification Search ............. 235/375, 235/492; 343/867, 895, 742; 340/572.7
See application file for complete search history.

(56) References Cited

U.S. PATENT DOCUMENTS

| | | | | |
|---|---|---|---|---|
| 5,707,475 A | * | 1/1998 | Steidinger et al. | .......... 156/257 |
| 5,867,100 A | * | 2/1999 | D'Hont | .................. 340/572.1 |
| 6,137,453 A | * | 10/2000 | Wang et al. | ................. 343/895 |
| 6,140,146 A | * | 10/2000 | Brady et al. | .................. 438/62 |
| 6,281,842 B1 | * | 8/2001 | Moren | ................. 343/700 MS |
| 6,373,708 B1 | * | 4/2002 | Ando et al. | ................. 361/737 |
| 6,478,229 B1 | * | 11/2002 | Epstein | ....................... 235/492 |
| 6,486,780 B1 | * | 11/2002 | Garber et al. | ............ 340/572.1 |
| 6,549,176 B1 | * | 4/2003 | Hausladen | .................. 343/895 |
| 6,648,232 B1 | * | 11/2003 | Emmert | ...................... 235/488 |
| 6,897,822 B1 | * | 5/2005 | Sparks et al. | ............... 343/767 |
| 6,897,830 B1 | * | 5/2005 | Bae et al. | .................... 343/895 |

FOREIGN PATENT DOCUMENTS

| KR | 2004-15608 | 2/2004 |
|---|---|---|
| KR | 2004-35109 | 4/2004 |

\* cited by examiner

*Primary Examiner*—Ahshik Kim
(74) *Attorney, Agent, or Firm*—St. Onge Steward Johnston & Reens LLC

(57) ABSTRACT

A smart label includes an antenna formed with a narrow film or panel-like material rolled in a roll, the film having one face of conductive layer and an opposite face of nonconductive layer, and a semiconductor chip attached to a side surface of the rolled antenna, the semiconductor chip having a first connection terminal connected to the conductive layer at a location adjacent to an outermost winding of the antenna and a second connection terminal connected to the conductive layer at a location adjacent to an innermost winding of the antenna.

12 Claims, 4 Drawing Sheets

SMART LABEL AND MANUFACTURING METHOD THEREOF

BACKGROUND OF THE INVENTION

This application claims the priority of Korean Patent Application No. 2003-53446, filed on Aug. 1, 2003, in the Korean Intellectual Property Office, the disclosure of which is incorporated herein in its entirety by reference.

1. Field of the Invention

The present invention relates to a smart label and a manufacturing method thereof, and more particularly, to a smart label having a rolled antenna, and a method of manufacturing the same.

2. Description of the Related Art

A radio frequency identification (RFID) tag, typically known as a smart label, is an electronic tag to be attached to a variety of items in order to control or track inventory of the items in real time. Such a smart label incorporates a radio frequency identification technique developed to reduce certain disadvantages of the conventional product identification method using a barcode and a wired reader for reading the barcode information.

Utilizing the radio frequency identification method, product information stored in the smart label or RFID tag of a product can be effectively identified by a radio frequency transmitted from a terminal which is typically connected to a host for processing the information. The smart label consists generally of an IC chip and an antenna communicating with the terminal or reader. The smart label can be used in a wide variety of applications including inventory control, product managements, and automatic or computerized purchasing managements for store fronts. For example, smart labels can be attached to the stocked items of a warehouse for an automatic inventory control and production management. Korean Patent Application Publication No. 2004-15608 published on 19 Feb. 2004 and Korean Patent Publication No. 2004-35109 published on 29 Apr. 2004 disclose technologies relating to the smart label.

FIG. 1 is a plan view of a conventional smart label known in the art. Referring to FIG. 1, a smart label includes a semiconductor chip 13 mounted on an upper surface of a nonconductive substrate 11, and an antenna connected to and extending from an antenna port of the chip 21. The antenna 12 has a flat pattern which is typically formed in a loop or spiral shape. This antenna is typically formed by coating a conductive metal film on the surface of the substrate 11 and etching in the pattern. The antenna 12 includes an inner port 14 and an outer port 15 which are electrically connected to each other.

In manufacturing the conventional smart labels, the connection process of the inner port 14 and the outer port 15 of the antenna 12 has certain technical difficulties. For connecting the inner port 14 and the outer port 15, a part of the upper portion of the antenna 12 was insulated using an insulation member and the inner port 14 and the outer port 15 were connected using a conductive paste such as a silver (Ag) paste. However, since the silver paste coating method adopts a screen printing method, this connection process becomes complicated. Also, since the silver paste has a conductivity of limited value, a recognition distance of the RF antenna is also limited. If the width of a pattern is enlarged to enhance the conductivity, the overall size of the label increases.

As an alternative method known in the art, an insulation paste or an insulation tape was applied on the lower portion of the substrate and the inner and outer ports 14 and 15 were connected with a tape having a metal foil laminated thereon by an ultrasonic wave. Although this method enhances the recognition distance of the antenna, it causes an increase in manufacturing cost because of its complex process.

SUMMARY OF THE INVENTION

The present invention is provided to address the above identified and/or other concerns. The present invention provides a smart label having an antenna formed of a film rolled in a roll, in which the film has a dielectric, first face and a conductive, second face. Methods of manufacturing the smart label are also disclosed.

According to one aspect of the present invention, a smart label comprises an antenna formed of a film rolled in a roll, the film having a dielectric first surface and a conductive second surface, and an electronic chip having a first connection terminal connected to a conductive portion of the film at an outermost winding of the antenna and a second connection terminal connected to a conductive portion of the film at an innermost winding of the antenna.

An indentation is preferably formed in a side surface of the antenna to accommodate the electronic chip therein.

The first and second connection terminals of the electronic chip are connected to the conductive portions of the antenna via a conductive paste.

One surface of the electronic chip is attached to the indentation of the antenna by an insulation paste and the opposite surface of the electronic chip is covered by a protection sheet.

The antenna preferably includes a core disposed inside the central cavity of the antenna. The core may be formed of an insulation material or a conductive material.

According to another aspect of the present invention, a method of producing a smart label comprises: providing an antenna precursor by rolling a film, the film having a conductive layer at least partially disposed thereon, cutting the antenna precursor into slices to form an antenna, and connecting first and second connection terminals of an electronic chip to the conductive layer of the film at an outermost winding of the antenna and an innermost winding of the antenna, respectively.

The method may further comprise forming an indentation in a side surface of the antenna, wherein the electronic chip is at least partially received in the indentation.

The method may further comprise providing the film of the antenna precursor by laminating the conductive layer on the film and separating the conductive layer in a lengthwise direction.

The step of providing an antenna precursor can be performed by rolling the film around a core member.

BRIEF DESCRIPTION OF DRAWINGS

The above and other features and advantages of the present invention will become more apparent by describing in detail preferred embodiments thereof with reference to the attached drawings in which.

DETAILED DESCRIPTION OF EMBODIMENTS

Figure 1:
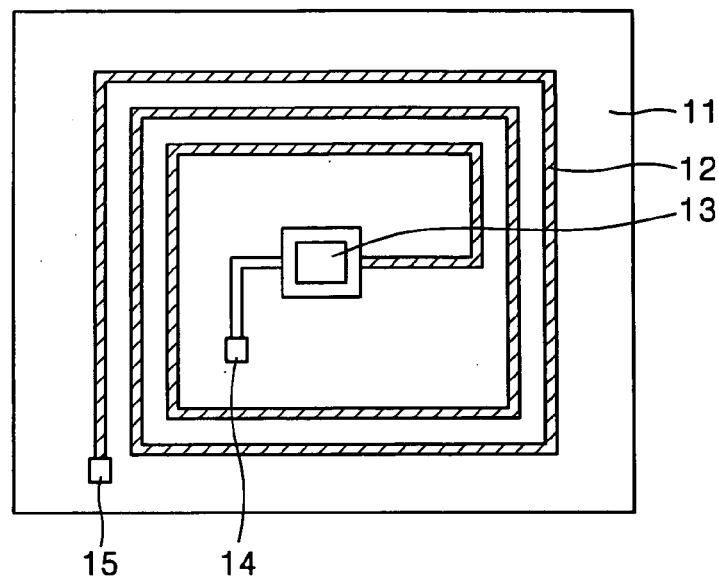
FIG. 1 is a plan view illustrating a smart label according to a conventional technology.
Figure 2:
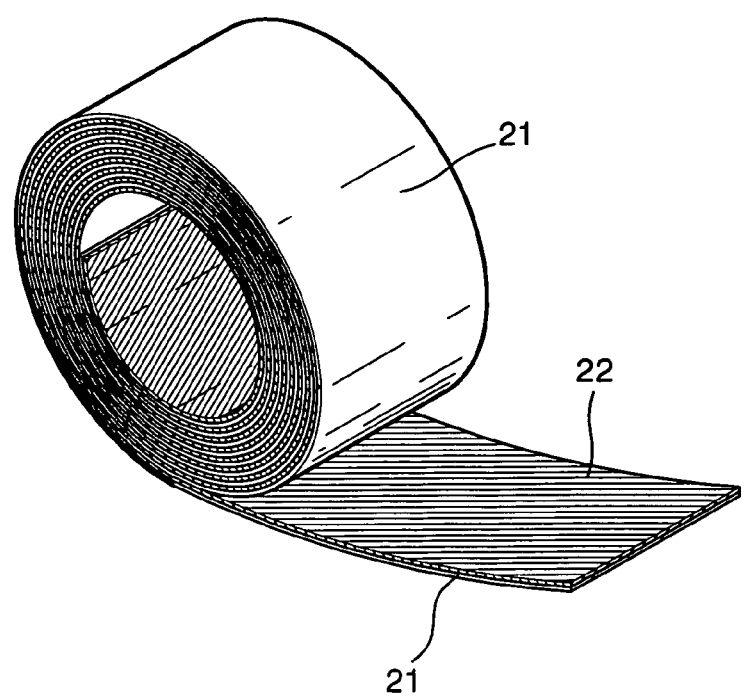
FIG. 2 is a perspective view illustrating a precursor of an antenna for a smart label according to one embodiment of the present invention.

Referring to FIG. 2, a precursor of an antenna is shown, which can be cut into slices for producing the antenna of the invention according to one preferred embodiment of the invention. Antenna precursor 30 is formed of a film or mat-type material which is rolled in a roll. The antenna precursor 30 includes a dielectric substrate 21 and a conductive layer 22 disposed on the substrate 21. The dielectric substrate 21 is preferably formed of a flexible or compliant material such as polyethylene resin, or the like. The conductive layer 22 is formed of or coated with copper, aluminum, or other known materials that exhibit a superior electrical conductivity. A core of particular shape and dimension (not shown) may be provided to roll the antenna precursor into a predetermined configuration. As shown in the drawings, the overall shape of the antenna precursor (and the antenna formed thereby) is preferably circular or cylindrical. However, the shape of the antenna precursor and the antenna can be oval, substantially rectangular, or in other configurations. The core is preferably formed of a dielectric material, but a conductive material may also be used.

Figure 3:
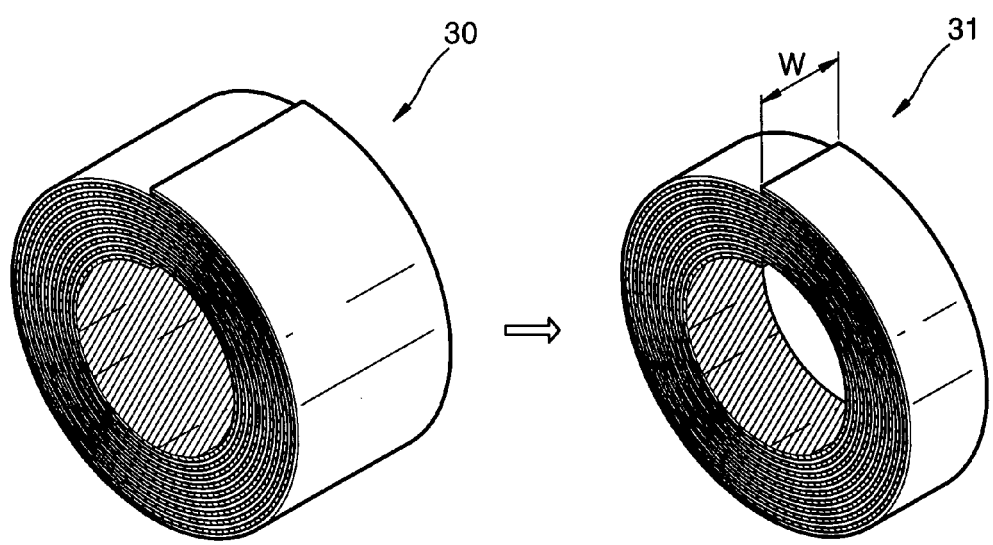
FIG. 3 is a perspective view illustrating an antenna of the invention which can be formed by cutting the antenna precursor of FIG. 2 into a plurality of unit antennas.

FIG. 3 illustrates a unit antenna of the invention which is formed by cutting the antenna precursor 30 into a plurality of slices where only one slice is shown for simplicity purposes. As shown in FIG. 3, an antenna precursor 30 is cut into unit antennas 31 having a predetermined width W. The width W of the rolled antenna 31 is relatively small (preferably about 1 mm) such that the size of the product (i.e., smart label) is limited when the unit antenna 31 is attached to the product.

According to one preferred embodiment of the invention, in order to facilitate the cutting, the conductive layer 22 is separated in a lengthwise direction by a known method before the antenna precursor is rolled into a roll. For instance, the conductive layer 22 can be separated by etching or using a blade of a knife, or otherwise, is formed or coated separately on the film 21 using a mold or other suitable means. Then, the rolled precursor can be easily cut, for example, by a laser or a blade of a knife along the longitudinal gap of the conductive layer.

Figure 4:
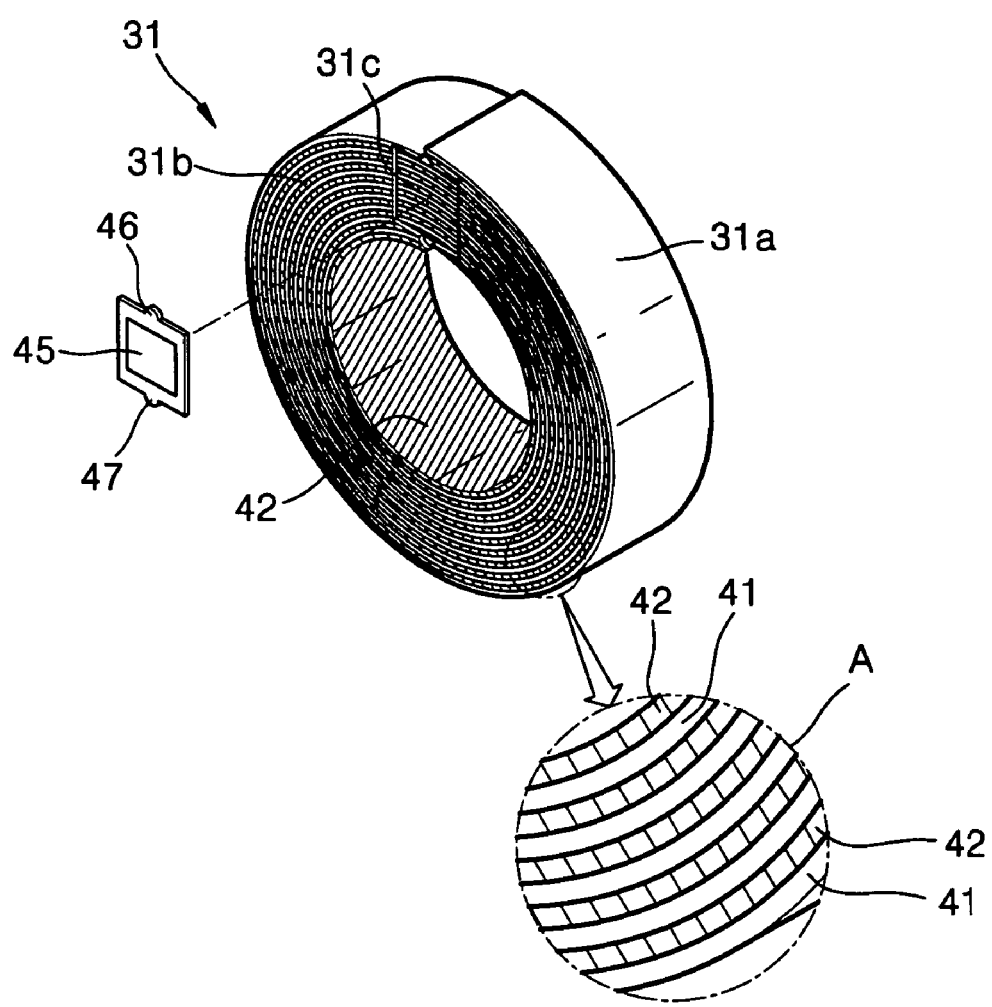
FIG. 4 is an exploded perspective view illustrating the antenna of FIG. 3 and a semiconductor chip to be attached to a side surface of the antenna.

FIG. 4 shows the antenna formed in accordance with the principles of the invention, and an electronic chip to be attached to the antenna of the invention. The unit antenna 31 has a thin disc shape and includes a circumferential surface 31a and a generally flat side surface 31b on either side thereof. The overall appearance of the antenna 31 may be circular, oval, or substantially rectangular as described above. The number of winding may also be varied depending on the particular designs of the smart label.

The antenna 31 includes dielectric or insulating layer 41 and conductive layer 42 formed in a roll as described above and shown in an enlarged circle A of FIG. 4. The dielectric layer 41 and conductive layer 42 appear alternately and are accessible from the side surface of the antenna 31. A semiconductor chip 45 is attached to one of the side surfaces 31b of the antenna 31. The semiconductor chip 45 has a first connection terminal 46 contacting at a conductive portion at the outermost winding of the antenna 31 and a second connection terminal 47 contacting at a conductive portion at the innermost winding of the antenna 31. The first and second connection terminals 46 and 47 of the semiconductor chip 45 are formed on a bottom surface of the semiconductor chip 45.

Figure 5:
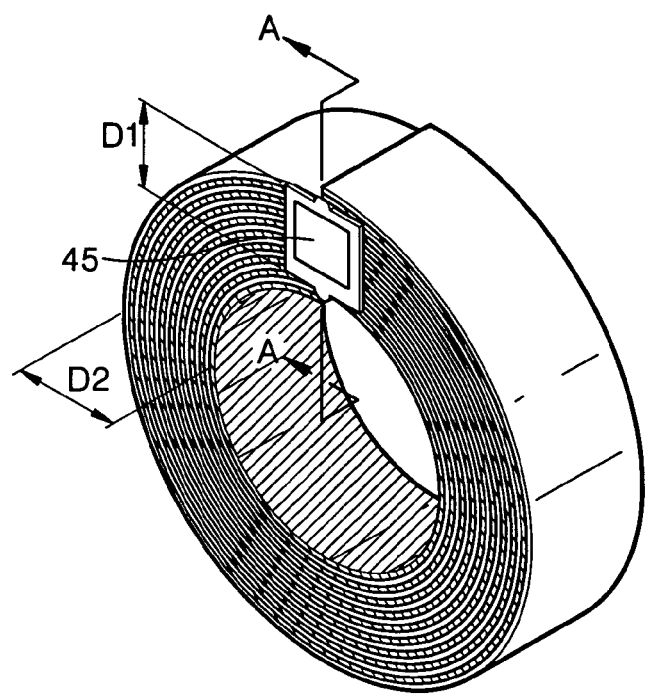
FIG. 5 is a perspective view illustrating the antenna of FIG. 4 with the chip attached thereto.

FIG. 5 illustrates the antenna 31 with the chip 45 attached to the antenna. As shown, the semiconductor chip 45 is attached to the side surface 31b of the antenna 31. The length of one side of the semiconductor chip 45 is indicated as D1 and the distance between the outermost winding and the innermost winding at the side surface 31b of the unit antenna is indicated as D2. The D1 is formed to be almost the same as the D2 in order to facilitate the connection of the semiconductor chip 45 with the two connection terminals 46 and 47 which are located preferably at each side end of the chip 45. This enables the electrical connection of the two terminals 46 and 47 at the conductive portions of the antenna 31 at the innermost winding and the outermost winding, respectively. However, when adopting the distance between the two terminals of the unit antenna 31 to be different from the distance between the connection terminals of the semiconductor chip 45, connection may be made using an auxiliary board, or by other known methods of connection.

According to one preferred embodiment of the invention, an indentation 31c may be formed at the side surface 31b of the unit antenna 31, as shown in FIG. 4, in order to accommodate the semiconductor chip 45 in the indentation. In this case, the semiconductor chip 45 is generally received in the indentation 31c without substantially protruding from the side surface 31b of the unit antenna 31. Here, the side surface of the antenna and chip combination becomes generally flat. The indentation 31c can be formed by a milling cutter or other suitable means.

The exposed surface of the semiconductor chip 45 may be covered with a protection film or an adhesive for protection.

Figure 6:
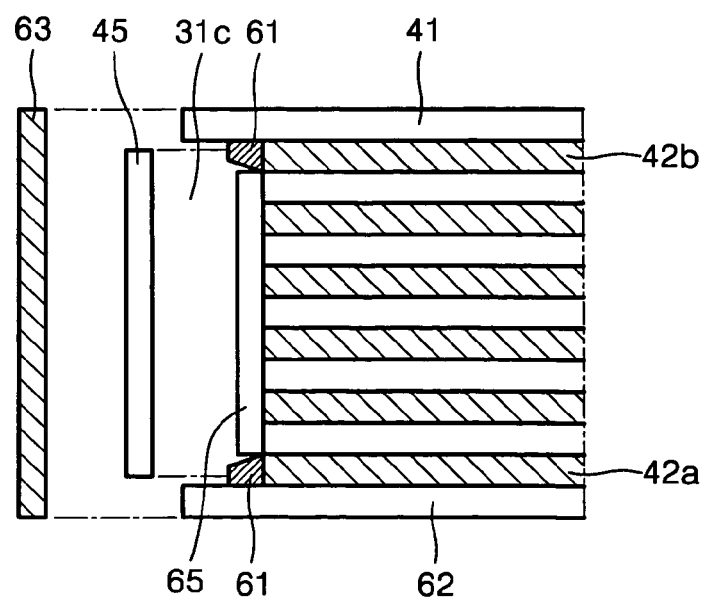
FIG. 6 is a sectional view taken along line A—A of FIG. 5.

FIG. 6 is a sectional view taken along line A—A of FIG. 5, which illustrates further details of the connection of the semiconductor chip 45 with the antenna 31. As shown, the dielectric layer 41 and the conductive layer 42 of the antenna are alternately arranged side by side. The antenna 31 includes outmost winding portion 42b and innermost winding portion 42a of the conductive layer 42 which is disposed on or laminated at the dielectric layer 41 of the antenna. A protection sheet 62 is attached to the innermost winding portion 42a of the conductive layer for protecting the surface of the conductive layer exposed to the inner cavity of the antenna 31. It is noted that FIG. 4 omits to show the protection sheet 62 for simplicity purposes. However, when the antenna precursor is formed using an insulation core as discussed above, the protection sheet 62 is not needed.

As discussed, the indentation 31c is formed on a side surface of the antenna 31 where the semiconductor chip 45 can be attached. An insulating adhesive 65 is preferably coated on the indentation 31c of the antenna. Here, the insulating adhesive 65 is coated on the indentation 31c except the external area defined by the innermost and outmost conductive layer portions 42a and 42b. The insulating adhesive 65 is used to attach the semiconductor chip 45 to the antenna 31. A conductive paste 61 is applied on the indentation 31c at the external area defined by the innermost and outmost conductive layer portions 42a and 42b. Via the conductive paste 61, the first connection terminal 46 of the semiconductor chip 45 is connected to the conductive layer portion 42b corresponding to the outermost winding and the second connection terminal 47 of the semiconductor chip 45 is connected to the conductive layer portion 42a corresponding to the innermost winding of the antenna. However, when the conductive paste is not used, the antenna terminals and the semiconductor chip terminals can be electrically connected in a known method such as a flip chip bonding method. As such, both connection terminals 46 and 47 of the semiconductor chip 45 and the conductive layer 42 are electrically connected. A protection film 63 is attached on the upper side of the chip 45. The protection film 63 may have an adhesive function to attach the label to the product.

In order to attach the smart label of the invention to the object products for inventory control or purchase management, for example, an adhesive is applied preferably on the side surface 31b of the antenna 31 where the semiconductor chip 45 is attached and positioned on a suitable surface of the product. Since the width (thickness) W of the antenna 31 is very small (e.g., about 1–2 mm), the label can be conveniently attached to the product without taking a large space or interfering with the flow of the products during the inventory management. The smart label of the invention having the antenna 31 formed with a conductive film as discussed has a relatively long recognition distance compared to the smart labels with conventional antennas.

As described above, according to the present invention, the manufacturing process of the antenna and the smart label can be simplified in comparison with the conventional technology. The smart label of the invention can also provide an enhanced performance such as an extended recognition distance.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A smart label comprising:
    an antenna formed of a film rolled in a roll, the film having a dielectric first surface and a conductive second surface; and
    an electronic chip at least partially received in an indentation formed in a side surface of the antenna, the electronic chip having a first connection terminal connected to a conductive portion of the film at an outermost winding of the antenna and a second connection terminal connected to a conductive portion of the film at an innermost winding of the antenna.

2. The smart label as claimed in claim 1, wherein the first and second connection terminals of the electronic chip are connected to the conductive portions of the film via a conductive paste.

3. The smart label as claimed in claim 1, wherein a surface of the electronic chip is attached to the indentation of the antenna by an insulating paste and an opposite surface of the electronic chip is covered by a protection sheet.

4. The smart label as claimed in claim 1 further comprising a core disposed within a central cavity of the antenna.

5. The smart label as claimed in claim 4, wherein the core is made of a dielectric material.

6. The smart label as claimed in claim 4, wherein the core is made of a conductive material.

7. The smart label as claimed in claim 1, wherein the antenna is formed in a circular shape.

8. The smart label as claimed in claim 1, wherein the antenna is formed in an oval or substantially rectangular shape.

9. The smart label as claimed in claim 1, wherein the antenna has a thickness less than about 2 mm.

10. A method of manufacturing a smart label comprising:
    providing an antenna precursor by rolling a film, the film having a conductive layer at least partially disposed thereon;
    cutting the antenna precursor into slices to form an antenna;
    placing an electronic chip at least partially in an indentation formed in a side surface of the antenna; and
    connecting first and second connection terminals of the electronic chip to the conductive layer of the film at an outermost winding of the antenna and an innermost winding of the antenna, respectively.

11. The method as claimed in claim 10, further comprising the step of providing the film of the antenna precursor by laminating the conductive layer on the film and separating the conductive layer in a lengthwise direction.

12. The method as claimed in claim 10, wherein the step of providing the antenna precursor is performed by rolling the film around a core member.

* * * * *